United States Patent
Wang et al.

(10) Patent No.: US 6,476,117 B1
(45) Date of Patent: Nov. 5, 2002

(54) GRAFTED NEAR-GELATION POLYMERS HAVING HIGH DAMPING PROPERTIES

(75) Inventors: Xiaorong Wang; Victor J. Foltz, both of Akron; Terrence E. Hogan, Cuyahoga Falls; James E. Hall, Mogadore, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/586,873

(22) Filed: Jun. 5, 2000

(51) Int. Cl.[7] ............................. C08L 23/26; C08L 23/36
(52) U.S. Cl. ..................... 524/504; 524/506; 524/514; 524/515; 524/517; 524/522; 525/64; 525/66; 525/69; 525/71; 525/74; 525/77; 525/78; 525/79
(58) Field of Search .................... 525/66, 64, 69, 525/71, 74, 77, 78, 79; 524/504, 506, 514, 515, 517, 522

(56) References Cited

U.S. PATENT DOCUMENTS

| | | | |
|---|---|---|---|
| 2,725,367 A | 11/1955 | Niederhauser et al. | |
| 2,971,934 A | 2/1961 | Brown et al. | |
| 3,244,664 A | 4/1966 | Zelinski et al. | |
| 3,281,383 A | 10/1966 | Zelinski et al. | |
| 3,297,654 A | 1/1967 | Barr et al. | |
| 3,414,551 A | 12/1968 | Reid et al. | |
| 3,428,596 A | 2/1969 | Strand et al. | |
| 3,480,580 A | 11/1969 | Joyner et al. | |
| 3,481,910 A | 12/1969 | Brunson et al. | |
| 3,492,227 A | 1/1970 | Kolaian | |
| 3,528,936 A | 9/1970 | Kent et al. | |
| 3,577,365 A | 5/1971 | Folzenlogen et al. | |
| 3,594,452 A | 7/1971 | De La Marre et al. | |
| 3,751,378 A | 8/1973 | Cowperthwaite et al. | |
| 3,761,458 A | 9/1973 | Holler et al. | |
| 3,796,687 A | 3/1974 | Collette et al. | |
| 3,840,449 A | 10/1974 | Furukawa et al. | |
| 3,862,265 A | 1/1975 | Steinkamp et al. | |
| 3,970,608 A | 7/1976 | Furukawa et al. | |
| 3,985,830 A | 10/1976 | Fetters et al. | |
| 3,998,907 A | 12/1976 | Di Giulio | |
| 4,015,612 A | 4/1977 | Pavlik et al. | |
| 4,017,669 A | 4/1977 | Collette et al. | |
| 4,087,485 A | 5/1978 | Huff | |
| 4,100,229 A | 7/1978 | Schwartz, Jr. | 260/887 |
| 4,104,332 A | 8/1978 | Zelinksi | |
| 4,132,531 A | 1/1979 | Cummings et al. | |
| 4,139,417 A | 2/1979 | Marie et al. | |
| 4,151,336 A | 4/1979 | Sackmann et al. | |
| 4,151,337 A | 4/1979 | Kanoh et al. | |
| 4,181,689 A | 1/1980 | Nagatoshi et al. | 525/419 |
| 4,287,314 A | 9/1981 | Fava | |
| 4,304,886 A | 12/1981 | Bean et al. | 525/314 |
| 4,374,951 A | 2/1983 | Lee et al. | 525/73 |
| 4,404,321 A | 9/1983 | Abolins et al. | 525/68 |
| 4,404,322 A | 9/1983 | Saito et al. | 525/74 |

(List continued on next page.)

FOREIGN PATENT DOCUMENTS

| | | | |
|---|---|---|---|
| AU | B-47913/85 | 4/1986 | |
| CA | 702610 | 1/1965 | |
| DE | 3430802 A1 | 3/1986 | |
| DE | 42 25 875 A1 | 2/1994 | |
| DE | 42 39437 A1 | 5/1994 | |
| DE | 42 41 538 A1 | 6/1994 | |
| DE | 195 02 206 A1 | 8/1996 | ......... C08F/291/00 |
| EP | 0 177 401 A1 | 4/1986 | |
| EP | 0322 905 A2 | 7/1989 | |
| EP | 0 408 470 A1 | 1/1991 | |
| EP | 0 440 922 A1 | 8/1991 | |
| EP | 0 536 753 A1 | 4/1993 | |
| EP | 0 728 767 A1 | 8/1996 | |
| EP | 0 879 832 A1 | 11/1998 | |
| GB | 922151 | 3/1963 | |
| JP | 6-248017 | 9/1954 | |
| JP | 54083989 | * 7/1979 | |
| JP | 59135267 | * 8/1984 | |
| JP | 60-243102 | 12/1985 | |
| JP | 6-56921 | 3/1994 | |
| JP | 8-255901 | 10/1996 | |
| WO | WO 01/09239 | 5/1996 | ........... C08G/18/10 |
| WO | WO 96/15170 | 5/1996 | |
| WO | WO 96/23007 | 8/1996 | |
| WO | WO 97/00898 | 1/1997 | |

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Synthesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun., 17, 835(1996). Synthesis and Photocrosslinking of Maleimide–Type Polymers.

W. Lee, and G. Hwong, J. Appl. Polym. Sci., 59, 599 (1996). Polysulfobetaines and Corresponding Cationic Polymers IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–co–maleic anhydride) with Primary N–Alkylamines by Reactive Extrusion.

*Primary Examiner*—Ana Woodward
(74) *Attorney, Agent, or Firm*—Meredith Palmer; Ann Skerry

(57) ABSTRACT

Thermoplastic elastomers containing hard segments formed from polyalkylenes and soft segments formed from elastomeric polymers near their gelation point are formed. Compositions containing these materials are elastomeric and exhibit excellent damping capabilities over a wide range of temperatures and frequencies.

19 Claims, No Drawings

U.S. PATENT DOCUMENTS

| | | | | |
|---|---|---|---|---|
| 4,408,010 | A | 10/1983 | Le-Khac | 525/73 |
| 4,423,196 | A | 12/1983 | Arlt et al. | 526/72 |
| 4,427,828 | A | 1/1984 | Hergenrother et al. | 525/66 |
| 4,502,229 | A | 3/1985 | Kitzman | 34/56 |
| 4,506,056 | A | 3/1985 | Gaylord | 524/445 |
| 4,540,753 | A | 9/1985 | Cozewith et al. | 526/88 |
| 4,585,824 | A | 4/1986 | Uchida et al. | 524/494 |
| 4,605,700 | A | 8/1986 | Le-Khac | 525/73 |
| 4,683,275 | A | 7/1987 | Kato et al. | 526/262 |
| 4,728,463 | A | 3/1988 | Sutker et al. | 252/609 |
| 4,732,928 | A | 3/1988 | Mizushiro et al. | 524/505 |
| 4,735,992 | A | 4/1988 | Nogues | 525/64 |
| 4,771,097 | A | 9/1988 | Sackmann et al. | 524/549 |
| 4,772,657 | A | 9/1988 | Akiyama et al. | 524/504 |
| 4,889,896 | A | 12/1989 | Canova et al. | 525/375 |
| 4,893,055 | A | 1/1990 | Fuzzi et al. | 313/479 |
| 4,912,144 | A | 3/1990 | McCready | 523/522 |
| 4,921,910 | A | 5/1990 | Lunt et al. | 525/74 |
| 4,931,502 | A | 6/1990 | McCready | 525/64 |
| 4,996,262 | A | 2/1991 | Pyke et al. | 525/177 |
| 5,008,324 | A | 4/1991 | Killgoar, Jr. et al. | 524/504 |
| 5,034,449 | A | 7/1991 | Mallikarjun | 524/504 |
| 5,037,924 | A | 8/1991 | Tazi et al. | 526/272 |
| 5,082,913 | A | 1/1992 | Tazi et al. | 526/272 |
| 5,122,161 | A | 6/1992 | Benfaremo et al. | 44/348 |
| 5,126,403 | A | 6/1992 | Graiver et al. | 525/58 |
| 5,156,920 | A | 10/1992 | Aycock et al. | 428/517 |
| 5,202,384 | A | 4/1993 | Pyke et al. | 525/167 |
| 5,212,227 | A | 5/1993 | Sakazume et al. | 524/504 |
| 5,219,628 | A | 6/1993 | Hathaway et al. | 428/36.9 |
| 5,225,498 | A | 7/1993 | Sorathia et al. | 525/454 |
| 5,244,971 | A | 9/1993 | Jean-Marc | 525/64 |
| 5,300,569 | A | 4/1994 | Drake et al. | 525/78 |
| 5,318,854 | A | 6/1994 | Hamersma et al. | 428/483 |
| 5,356,953 | A | 10/1994 | Harada et al. | 523/171 |
| 5,373,048 | A | 12/1994 | Witzeman et al. | 524/458 |
| 5,414,044 | A | 5/1995 | Moriya et al. | 525/74 |
| 5,432,662 | A | 7/1995 | Kato et al. | 360/133 |
| 5,472,741 | A | 12/1995 | Sackmann et al. | 427/389 |
| 5,489,657 | A | 2/1996 | Sue et al. | 526/65 |
| 5,494,964 | A | 2/1996 | Meichsner et al. | 525/10 |
| 5,494,981 | A | 2/1996 | Gorodisher et al. | 525/504 |
| 5,532,317 | A | 7/1996 | Shinmura et al. | 525/73 |
| 5,536,774 | A | 7/1996 | Segatta | 524/505 |
| 5,548,031 | A | 8/1996 | Doi | 525/327.4 |
| 5,585,434 | A | 12/1996 | DeNicola, Jr. et al. | 525/67 |
| 5,585,436 | A | 12/1996 | Niessner et al. | 525/105 |
| 5,602,200 | A | 2/1997 | Wissmann | 525/66 |
| 5,618,881 | A | 4/1997 | Hojabr | 525/64 |
| 5,634,122 | A | 5/1997 | Loucks et al. | 395/608 |
| 5,637,410 | A | 6/1997 | Bonner et al. | 428/516 |
| 5,651,927 | A | 7/1997 | Auda et al. | 264/85 |
| 5,652,307 | A | 7/1997 | Niessner et al. | 525/101 |
| 5,654,364 | A | 8/1997 | Bates et al. | 525/98 |
| 5,655,820 | A | 8/1997 | Kervagoret | 303/117.1 |
| 5,658,985 | A | 8/1997 | Eichenauer et al. | 525/83 |
| 5,665,820 | A | 9/1997 | Liestner et al. | 525/66 |
| 5,670,006 | A | 9/1997 | Wilfong et al. | 156/236 |
| 5,684,122 | A | 11/1997 | Inoue et al. | 528/363 |
| 5,691,411 | A | 11/1997 | Khouri et al. | 525/64 |
| 5,710,228 | A | 1/1998 | Krause et al. | 526/262 |
| 5,776,234 | A | 7/1998 | Schilling | 106/277 |
| 5,783,630 | A | 7/1998 | Evans et al. | 525/74 |
| 5,798,413 | A | 8/1998 | Spelthann et al. | 525/166 |
| 5,798,414 | A | 8/1998 | Mishima et al. | 525/77 |
| 5,821,032 | A | 10/1998 | DoMinh | 430/283.1 |
| 5,869,695 | A | 2/1999 | Ulmer et al. | 548/545 |
| 5,883,188 | A | 3/1999 | Hwang et al. | 525/71 |
| 5,905,116 | A | 5/1999 | Wang et al. | 525/74 |
| 5,910,530 | A | * 6/1999 | Wang et al. | 524/534 |
| 5,912,296 | A | 6/1999 | Wang et al. | 524/534 |
| 5,965,666 | A | 10/1999 | Koo et al. | 525/66 |
| 6,054,532 | A | * 4/2000 | Wang et al. | 525/66 |

* cited by examiner

GRAFTED NEAR-GELATION POLYMERS HAVING HIGH DAMPING PROPERTIES

FIELD OF THE INVENTION

The present invention is generally directed to thermoplastic elastomers and compositions containing such thermoplastic elastomers that are useful for damping. More particularly, the thermoplastic elastomers of this invention are multi-block polymers that contain hard and soft segments. The soft segments include near gelation polymers that impart damping properties to the thermoplastic elastomer over a wide range of temperatures and frequencies.

BACKGROUND OF THE INVENTION

Damping is the absorption of mechanical energy, such as vibrational or sound energy, by a material in contact with the energy source. Damping or mitigating the transmission of the vibrational energy from sources such as motors, engines, and the like can be desirable. When viscoelastic materials are used in damping applications, they absorb and convert energy to heat. Such materials preferably are effective over a wide range of temperatures and frequencies.

The viscoelastic nature of materials can be mathematically represented by the formula $G^*=G'+iG''$ where $G^*$ is the complex shear modulus, $G'$ is the elastic or storage modulus, $G''$ is the viscous or loss modulus and $i$=the square root of $-1$. The effectiveness of a viscoelastic material for damping purposes can be quantified by measuring its viscoelastic response to a periodic stress or strain. Results of dynamic mechanical tests are generally given in terms of $G'$ and $G''$, the latter of which is directly related to the amount of mechanical energy that is converted to heat, or in other words, damping.

The ratio of the loss modulus $G''$, to the elastic modulus $G'$, is referred to as tan $\delta$ which is a measure of the ability of a given material to dissipate mechanical energy into heat versus the purely elastic storage of mechanical motion during one cycle of oscillatory movement. Tan $\delta$ can be measured by a dynamic analyzer, which sweeps a range of frequencies at a fixed temperature and repeats that sweep of frequencies at several other temperatures. From the generated data, a master curve of tan $\delta$ versus frequency can be developed.

Tan $\delta$ can be adjusted or broadened by taking advantage of the glass transition temperature of several materials within a temperature range. One example of this is a composition including resins cured in sequential fashion by a single BrØnsted acid catalyst, which activates an epoxy resin component and then catalyzes cyanate trimerization into poly(triazines). The composition provides a glass transition damping peak around 100° C. and is understood to be heat stable over a temperature range of about 0° to at least 300° C.

Another exemplary composition includes a soft crosslinked elastomeric binder containing microscopically discrete segments of multiphase thermoplastic elastomeric polymer that have at least two polymeric phases (i.e., an initial linear or lightly linked polymeric phase and a second polymeric phase in the form of discrete domains dispersed within the initial polymeric phase). The initial polymer phase provides a glass transition damping peak around 10° to 70° C.

Another known damping material includes an interpenetrating polymer network having a soft polyurethane component and a hard poly(vinyl ester) component which are formed in the presence of one another and cured at room temperature. The interpenetrating polymer network is taught to have an acoustic damping factor in excess of 0.2 over a temperature range of from about 15° to about 85° C., with a glass transition damping peak at about 55° C.

Another known vibration damping composition includes an acrylate-containing thermoset resin incorporating an interpenetrating network of polymerized epoxy and a poly (acrylate). This resin is said to have a glass transition temperature in the range of about −2° to about 200° C. at 1 Hz.

Although numerous compositions are known for damping, there is a need for improved damping compositions that exhibit a high degree of damping over a wide range of temperatures and frequencies without involving glass transition peaks. Enhancing hysteresis (tan ($\delta$)) by using the super position of glass transition peaks is not desirable because the modulus of the material drops dramatically at or about the glass transition temperature.

SUMMARY OF INVENTION

Briefly, the present invention provides a thermoplastic elastomer including a multi-block polymer that includes randomly distributed hard and soft segments connected by covalent bonds. The hard segments include polymeric chains of a crystalline polyalkylene, while the soft segments include a near-gelation polymer. The hard and soft segments are connected by covalent bonds.

In another aspect, the present invention provides a thermoplastic elastomer produced by allowing a functionalized, near-gelation polymer to react with a functionalized, crystalline polyalkylene and allowing for a time sufficient to form the elastomer.

In a further aspect, the present invention provides a method of making a thermoplastic elastomer. In the method, a composition including a liquid, crosslinkable, functionalized polymer having low or no unsaturation is subjected to the action of a crosslinking agent so as to form a near-gelation elastomer that includes a crosslinked polymer. Thereafter, a covalent bond is allowed to form between at least one functional group on each of the near-gelation elastomer and a functionalized crystalline polyalkylene. The near-gelation elastomer has a physical state relative to the gelation point of the crosslinked polymer defined by $$0 \leq |(r-r_g)/r_g| \leq 0.5$$

in which r is the weight ratio of the crosslinking agent to the functionalized prepolymer, and $r_g$ is the weight ratio of the crosslinking agent to the functionalized prepolymer at the gelation point of the crosslinked polymer.

DETAILED DESCRIPTION

Thermoplastic elastomers that contain at least one block of a near-gelation polymer have been found to exhibit excellent damping characteristics over a wide range of temperatures and frequencies. These thermoplastic elastomers have a tan $\delta$ which is greater than or equal to about 0.4 from about −30° to about 50° C. and which preferably is substantially constant throughout this temperature range. Additionally, these thermoplastic materials are elastomeric at room temperature and are thermally processable as thermoplastics at a temperature above 100° C. The thermoplastic elastomers can be soft and possess a Shore A hardness that is less than or equal to about 40.

The thermoplastic elastomers of this invention are multi-block polymers that include at least one soft, near-gelation polymeric segment and at least two hard, crystalline polyalkylene segments connected by covalent bonds. These elastomers can contain more than one soft segment and more than two hard segments. Moreover, they are not necessarily linear, resulting from the non-linear nature of the near-gelation polymer. In general, the near-gelation polymer includes many chain ends, at least two of which are linked to crystalline, polyalkylene hard segments. Depending on the number of hard and soft segments, these polymers can include a three-dimensional, interconnected polymeric network. The thermoplastic elastomer molecules provide an interconnected array of numerous branched soft segments connected to numerous crystalline, polyalkylene hard segments. The hard and soft segments of the thermoplastic elastomers of this invention are believed to be phase separated with the hard segments forming crystallized domains at room temperature.

The nature of the hard and soft segments can be understood with reference to the individual components used to create them. In general, the thermoplastic elastomers are prepared by linking a functionalized near-gelation polymer to a functionalized crystalline polyalkylene through the functional groups on each. As discussed in greater detail hereinbelow, the hard and soft segments can be linked through a direct reaction between the respective functional groups or through the functional groups by using a linking agent or extender.

Numerous functionalized crystalline polyalkylenes are available for use in this invention. Generally, these polyalkylenes have a weight average molecular weight ($M_w$), as measured by GPC with polystyrene as a standard, of from about 2,000 to about 1,000,000, preferably from about 4,000 to about 50,000, and more preferably from about 10,000 to about 50,000. These polyalkylenes preferably are crystalline at room temperature; accordingly, they can have a melting temperature above about 80° C., more preferably above about 100° C., and even more preferably above about 150° C.

The polymeric backbone of the functionalized crystalline polyalkylenes can include products from the polymerization of one or more olefins. Examples of suitable olefins useful in synthesizing these polymers include $C_2$–$C_7$ α-olefins including one or more of ethylene, propylene, 1-butene, 1-pentene, 1-hexene, 2-methyl-1-propene, 3-methyl-1-pentene, 4-methyl-1-pentene, 5-methyl-1-hexene. Non-limiting examples of such crystalline polymers include isotactic and syndiotactic polyethylene and polypropylene, with polypropylene being preferred. Such polyalkylenes can be synthesized by a variety of techniques known to those of ordinary skill in the art. Particularly preferred are those polyalkylenes prepared with stereospecific initiator systems such as, for example, metallocene systems.

Functionalized polyalkylenes contain at least one pendent functional group. As known in the art, polyalkylenes can be functionalized with a variety of pendent groups including, without limitation, those that derive from acid anhydrides—including phthalic anhydride, hexahydrophthalic anhydride, maleic anhydride, fumaric anhydride, itaconic anhydride, pyromellitic anhydride, trimellitic anhydride, succinic anhydride, citraconic anhydride, cyclohexane dicarboxylic anhydride, so-called madic anhydride, and numerous alkyl and alkenyl derivatives of these compounds—as well as unsaturated carboxylic acids such as acrylic acid, methacrylic acid, ethacrylic acid, maleic acid, fumaric acid, and itaconic acid. The use of primary amines, secondary amines, or a variety of other functional groups known in the art capable of grafting or reacting with a crosslinking agent also are suited to the present invention.

Many functionalized polyalkylenes are commercially available such as, for example, Exxelor™ PO 1015 maleated polypropylene (Exxon Chemical Co.; Houston, Tex.). Typically, functionalized polyalkylenes are prepared by grafting functional group to the polyalkylene chain. Alternatively, copolymerization processes can prepare these functionalized polyalkylenes where at least one of the monomers being polymerized includes a group than can serve as a functional group on the resulting polymer.

The near-gelation soft segments of the thermoplastic elastomer are an interconnected array of elastomeric molecules that have been crosslinked to some degree but not fully cured. A near-gelation polymer can be formed when the degree of interchain reaction, i.e., crosslinking, between the elastomeric molecules nears or approaches the gel point of the polymeric composition. At the gel point, a gel or insoluble polymer fraction forming in a polymeric composition first becomes observable.

Theoretically, a gel corresponds to an infinite network in which polymer molecules have been crosslinked to one another to form a macroscopic molecule. The gel may then be considered one molecule. A gel generally is insoluble in all solvents at elevated temperatures under conditions where polymer degradation does not occur; the non-gel portion of the polymer, often referred to as sol, remains soluble in solvents. For present purposes, near-gelation polymers also can be referred to as near-gel polymers.

When forming a near-gelation polymer, the gel point of the polymeric composition employed to create the near-gelation polymer preferably is determined. Several techniques are known in the art for estimating the gel point of polymeric compositions. Gel point can be determined experimentally by solvent extraction and other techniques described in P. J. Flory, *Principles of Polymer Chemistry* (1953). Gel point also can be approximated by using theoretical calculations as described in, for example, G. Odian, *Principles of Polymerization,* 3d ed., pp. 108–123, (1991). Throughout the present description, the polymeric composition employed to create the near-gelation polymer can be referred to as the prepolymer system.

Although gel point can be discussed in terms of a variety of parameters, determining the ratio of the weight of curative to the weight of prepolymer necessary to reach the gel point can be convenient. Thus, gel point can be represented by the weight of curative necessary to reach gelation, $W_{cg}$, over the weight of prepolymer, $W_p$. Likewise, the point of complete cure can be represented by the weight of curative necessary to reach complete cure, $W_{cc}$, divided by $W_p$. In general, therefore, the extent of any curing reaction can be represented by the weight of curative added, $W_c$, divided by $W_p$. For present purposes, extent of reaction, r, can be represented by $W_c$ over $W_p$. Therefore, the extent of gelation, $r_g$, is $r_g=W_{cg}/W_p$, and the extent of complete cure $r_{cc}=W_{cc}/W_p$.

Once the gel point of the prepolymer is determined, an appropriate amount of curative can be added and reacted with the prepolymer to achieve a near-gelation polymer. When selecting an appropriate amount of curative, the gel point preferably is approached but not exceeded, although the definition of near-gelation polymer broadly includes those reaction products of curative and prepolymer that exceed the gel point without actually reaching complete cure. Thus, the weight ratio employed to create a near-gelation polymer preferably is based on $E=|(r-r_g)/r_g|$ where E is the relative distance to the gel point while r and $r_g$ are defined as above. Since E is an absolute value, E is greater than or equal to 0 and less than or equal to about 0.5, more preferably less than about 0.2, still more preferably less than about 0.1, and even more preferably no more than about 0.05. The foregoing formula involves the absolute value of a number and, therefore, the extent of the reaction (r) is a relative distance (E) both beyond and before the gel point. For example, where the gel point of a particular polymeric composition is about 0.5 parts of curative per part of prepolymer, a near-gel polymer can be obtained by reacting the polymeric composition with about 0.3 or about 0.7 parts of curative per part of the prepolymer (thus, $E=|(0.3-0.5)/(0.5)|=0.4$ or $E=|(0.7-0.5)/(0.5)|=0.4$).

The prepolymer used in preparing the near-gelation polymer includes at least one functional group, preferably at least two functional groups, more preferably between two and about ten functional groups, and even more preferably between two and about five functional groups. For present purposes, the prepolymer can be referred to as the functionalized prepolymer. The functional groups can be located at the terminal end of the prepolymer, including the initiated end of the polymer, or along the backbone of the prepolymer. Therefore, crosslinking can occur anywhere on the prepolymer chain.

Functionalized prepolymers useful in preparing the near-gelation polymers can include any of the sundry functional groups that commonly are incorporated in or grafted to polymers. For example and without limitation, functional groups can include primary amino, secondary amino, hydroxyl, carboxyl, vinyl, epoxy, anhydride, aryl halide, carboxylic acid anhydride, carboxamide, and isocyanate groups. As noted above, these functional groups can be located anywhere along the prepolymer backbone, including the ends of the prepolymer. For additional examples and a further discussion of functionalized prepolymers, reference is made to Brown, "Reactive Extrusion: A Survey of Chemical Reactions of Monomers and Polymers During Extrusion Processing," *Reactive Extrusion Principles and Practice*, (1992).

Although any elastomeric macromolecule can be functionalized to form the functionalized prepolymer, the elastomer preferably is saturated, i.e., less than about 5% (by wt.) of the polymer, preferably less than about 3% (by wt.) of the polymer, more preferably less than about 1% (by wt.) of the polymer, and even more preferably less than about 0.5% (by wt.) of the polymer, includes curable double bonds (is it then capable of being functionalized). Non-limiting examples of polymers that may be functionalized to obtain the functionalized prepolymers useful in forming the soft segments include styrene/butadiene copolymers (and hydrogenated variants); polyisoprene; nitrile rubber (and its hydrogenation product); chloroprene rubber; butyl rubber; ethylene/propylene rubber; ethylene/propylene/diene rubber; ethylene/butene rubber; ethylene/butene/diene rubber; acrylic rubber; α,β-unsaturated nitrile/acrylate/conjugated diene copolymer rubber; chlorinated polyethylene rubber; fluororubber; silicone rubber; urethane rubber; polysulfide rubber; styrene/butadiene block copolymer (and its hydrogenated variants); and the like. Among these rubbery polymers, preferred are those that are essentially saturated or a low degree of unsaturation, such as hydrogenated styrene/butadiene rubber, hydrogenated nitrile rubber, ethylene/propylene rubber, ethylene/propylene/diene rubber, ethylene/butene rubber, ethylene/butene/diene rubber, acrylic rubber, chlorinated polyethylene rubber, fluororubber, silicone rubber, urethane rubber, polysulfide rubber, hydrogenation product of styrene/butadiene block polymer, α,β-unsaturated nitrile/acrylate/conjugated diene copolymer rubber, and the like modified by introducing a graftable functional group into the above rubbers.

Non-limiting examples of saturated polymers that can be functionalized to obtain the preferred functionalized prepolymers useful in forming the soft segments include ethylene/propylene copolymer, polyisobutylene, butyl rubber, hydrogenated copolymers such as styrene/butadiene copolymer, hydrogenated polyisoprene, and hydrogenated high-vinyl polybutadiene. Each of these elastomers is commercially available from a number of sources and capable of being synthesized by a number of synthetic techniques such as, for example, anionic polymerization, cationic polymerization, Ziegler-Natta polymerization, and radical chain polymerization including free radical polymerization. One can refer to Odian, *Principles of Polymerization*, 3d ed., (1991) for additional information on the various techniques that can be employed in making such polymers.

The molecular weight of the functionalized prepolymer can vary. The number average molecular weight ($M_n$) of the prepolymer can be between about 1,000 and about 100,000, more preferably between 1,000 and about 80,000, and even more preferably between about 2,000 and about 50,000. The degree of functionalization of the prepolymer preferably involves at least one functional group per one hundred repeating units within the polymer (i.e., at least one functional group per entanglement molecular weight).

Crosslinking agents that can be employed to react with the functionalized prepolymer and thereby form the near-gelation polymers include any crosslinking agents capable of reacting and forming a covalent bond with the functional group on or within the functionalized prepolymer. The crosslinking agent preferably contains at least two functional groups that can react with functional groups on the prepolymer molecules. The crosslinking agent preferably contains between 2 and about 10 functional groups, more preferably between 2 and about 5 functional groups. For present purposes, these agents may be referred to as multifunctional crosslinking agents. Exemplary functional groups include primary amino, secondary amino, hydroxyl, carboxyl, vinyl, epoxy, anhydride, aryl halide, carboxylic acid anhydride, carboxamide, and isocyanate groups. Some specific useful crosslinking agents include, without limitation, diisocyanates, phenolic resins including resole phenolics and novolak phenolics, diamines, dihydroxyl ethane, and dicarboxyl ethane.

The ordinarily skilled artisan readily can select an appropriate functionalized prepolymer and complementary crosslinking agent to carry out the branching or crosslinking reaction. Preferably, the crosslinking reaction will be a single step reaction. For example, 2,4-diisocyanate can react with and crosslink a hydroxy functionalized prepolymer. Other single-step reactions include, but are not limited to, ester reactions that take place between carboxyl and hydroxyl groups, amide reactions that take place between amino groups and carboxyl groups, urethane reactions that take place between isocyanate groups and hydroxyl groups, epoxy reactions that take place between epoxy groups and amino groups, and imide reactions that take place between anhydride groups and amino groups. Preferred reactions include those that do not generate small molecules, such as urethane and epoxy reactions. In a preferred embodiment, the functionalized prepolymer and the crosslinking agent each contain at least two reactive functional groups independently selected from hydroxy, oxirane, amino, carboxylic acid, isocyanate, oxirane, and succinyl oxide. For a further understanding of these reactions, one can refer to Reactive Extrusion, discussed previously.

Also, without undue calculation or experimentation, the ordinarily skilled artisan can select the appropriate reaction conditions necessary to achieve near-gelation polymers. Under certain circumstances, a catalyst may be needed to effect crosslinking.

Inasmuch as the prepolymers used to form the near-gelation soft segments contain functional groups, and because these prepolymers are not fully cured or crosslinked, the near-gel polymers inherently are functionalized and therefore capable of being linked to the polyalkylene hard segments. Functionalized, near-gelation polymers contain residual functional groups that were unreacted during the formation of the near-gelation polymer. These residual functional groups include those groups or substituents disclosed above (for the prepolymers) employed in preparing the near-gelation polymers.

In preparing the end product thermoplastic elastomers, the functionalized, crystalline polyalkylenes and the functionalized, near-gelation polymers are allowed to react with a covalent bond forming therebetween. This reaction can take place directly between the respective functional groups, either in the presence or in the absence of a catalyst or promoter, or through the use of a linking agent or extender. Because both the crystalline polyalkylene and the near-gelation polymer can be functionalized with groups or substituents that are the same or similar to the functional groups on the prepolymer used to prepare the near-gelation polymers, the reactions employed to crosslink the prepolymers and to form near-gelation polymers can be employed to bond the near-gelation polymer to the functionalized, crystalline polyalkylenes.

In one embodiment of the present invention, this bonding or linking reaction includes a single step reaction. For example, a maleic anhydride-functionalized polypropylene hard segment or polymer can react with residual hydroxyl groups included in a near-gelation polymer that was prepared from hydroxy-terminated saturated polymers such as hydroxy-terminated, hydrogenated polyisoprene polymers.

In another embodiment, a linking agent or extender can be employed to connect the functionalized, near-gelation soft segment to the functionalized, crystalline hard segment. Any linking agent employed preferably is capable of reacting with and forming a covalent bond with at least one functional group on each of the two component functionalized polymers. Accordingly, the linking agent preferably contains at least two functional groups, one that reacts with a functional group on the functionalized, crystalline polyalkylene and one that reacts with a functional group on the near-gelation polymer. For example, where the functionalized, near-gelation polymer and functionalized, crystalline polyalkylene each contain an amine functionality, a phenolic resin (also referred to as a resole) can be employed to link the hard and soft segments together. A specific example of a resole resin is dimethylol phenol, made by condensation of alkyl substituted phenol or unsubstituted phenol with an aldehyde, such as formaldehyde, in an alkaline medium or by condensation of bifunctional phenol dialcohols. A commercially available phenolic resin is SP-1045 di-methylol-p-acetyl resin (Schenectady International; Schenectady, N.Y.). Other linking agents or extenders that can be employed include diisocyanates such as 2,4-diisocyanate, 1,4-diisocyanate and 1,3-diisocyanate, and the like.

The thermoplastic elastomers or grafted near-gelation polymer compositions of the present invention can contain plasticizers such as, for example, rubber extending plasticizers and compounding oils. These liquid plasticizers can be dispersed in the thermoplastic elastomers in accordance with this invention. Suitable plasticizers include, for example, paraffinic oils, naphthenate oils, aromatic oils, liquid polybutenes, alkyl (or aryl) phthalates, vegetable oils, mineral oils, trimellitates, esters of polyethylene glycols, alkyl (or aryl) phosphates, methyl ester of hydrogenated wood rosin, liquid rosin oils, pine tar, polyterpenes, non-reacting liquid rubbers. Rubber compounding oils are known in the art and include both highly saturated and highly aromatic oils. Preferred plasticizers are highly saturated oils, e.g., PW380 paraffin oil (Idemitsu Kosan Co., Ltd.; Tokyo, Japan). The amounts of rubber compounding oil employed can vary from 0 to about 500 phr (parts by weight, pbw, per hundred parts by weight of rubber), preferably between about 0 to about 1000 phr, and most preferably between about 0 and about 200 phr.

Thermoplastic elastomers can be formulated in a solvent solution. The components of the grafted near-gelation polymer composition can be dissolved in a solvent or blend of solvents. Aromatic hydrocarbon solvents such as toluene, xylene, and the like are suitable. If desirable, a lower viscosity often can be obtained by using a blend of an aromatic hydrocarbon and a polar solvent. Suitable polar solvents include esters such as isopropyl acetate, ketones such as methyl isobutyl ketone, and alcohols such as isopropyl alcohol. The amount of polar solvent used can depend on the particular polar solvent chosen and the level of functionality on the functionalized prepolymer. Usually, the amount of polar solvent used is between 0 and 50% by weight in the solvent blend.

The thermoplastic elastomer composition can also be formulated by dry mixing methods. Damping materials according to this invention preferably are manufactured by mixing and dynamically heat-treating the components described above, namely, by melt-mixing. Any conventional, generally known mixing equipment such as an open-type mixing roll, closed-type Banbury mixer, closed type Brabender mixer, extruding machine, kneader, continuous mixer, or the like can be used, although a closed-type Brabender mixer can be preferable. Mixing in an inactive gas environment, such as $N_2$ or Ar, also is preferable.

Compositions of the present invention typically are prepared by reacting the components at an elevated temperature, preferably between about 50° and about 200° C., until reaction is essentially complete. Reaction time usually is less than about three hours.

The thermoplastic elastomers or grafted near-gelation polymers can have an extender added to the prepared polymers during final processing. Suitable extenders include extender oils and low molecular weight compounds or components. Useful extender oils include those known in the art such as, for example, naphthenic, aromatic and paraffinic petroleum oils as well as silicone oils. The amount of the extender employed can vary from 0 to about 500 phr. Examples of low molecular weight organic compounds or components useful as extenders in the compositions of the present invention are low molecular weight organic materials having a $M_n$, of less than 20,000, preferably less than 10,000, and most preferably less than 5,000. Although there is no particular limitation to the material that may be employed, the following is a list of exemplary appropriate materials:

1) softening agents, namely aromatic, naphthenic, and paraffinic softening agents for rubbers or resins;

2) plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

3) tackifiers, namely, coumarone-indene resins, terpene phenol resins, petroleum hydrocarbons and rosin derivative;

4) oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly($\alpha$-olefins);

5) lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and, 6) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low molecular weight organic materials include latices, emulsions, liquid crystals, bituminous compositions, polymers, and phosphazenes. One or more of these materials may be used as extenders.

The thermoplastic elastomers of the present invention can have added thereto at least 1 pbw, preferably 5 to 500 pbw, of extender per 100 pbw thermoplastic elastomer. Most preferred amounts of added extender include from about 5 to about 50 pbw oil per 100 pbw thermoplastic elastomer. The weight percent ratio of the thermoplastic elastomer to the extender is from about 10:1 to about 1:10, preferably 5:1 to 1:5.

Thermoplastic elastomers produced according to the present invention generally have high damping properties, i.e., have a tan $\delta$ in the range of about 0.1 to about 1.0, preferably higher than 0.3, over the temperature range of −20° to 100° C., and a Shore A hardness (at about 20° to 25° C., i.e., at room temperature) ranging from 0 to about 40, preferably about 0 to about 20. The service temperature of the thermoplastic elastomers of the present invention is less than or equal to 100° C. for most of the polymers of the present invention, e.g., 100° C. compression set of the thermoplastic elastomers is about 30 to 65%. Some of the extended polymers of the present invention can be used at a temperature up to about 150° C.

Frequently, including other additives known in the art to the compositions of the present application is desirable. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel di-butyl-di-thiocarbamate, zinc di-butyl di-thiocarbamate, tris (nonylphenyl) phosphite, 2,6-di-t-butyl-4-methylphenol and the like. Exemplary conventional fillers and pigments include any of the sundry fillers, including reinforcing fillers, commonly used in elastomeric compositions of matter. These include, for example and without limitation, carbon black, silica, mineral fillers such as clays, including hard clays, soft clays, and chemically modified clays, mica, talc, (magnesium silicate), calcium carbonate, titanium dioxide, ground coal, cryogenically ground rubber, magnesium-hydroxide, alumina trihydrate, iron oxide and mixtures thereof These compounding ingredients are incorporated in suitable amounts depending upon the contemplated use of the product, preferably in the range of 1 to 350 pbw of additives or compounding ingredients per 100 pbw of thermoplastic elastomer.

Compositions of the present invention can be used in the manufacture of a wide variety of products in which a high degree of softness, heat resistance, decent mechanical properties, elasticity, and/or high damping are desirable. Compositions of the present invention can be used in, for example, the fabrication of automotive parts, household electrical appliances, industrial machinery, precision instruments, transport machinery, constructions, engineering, and medical instruments. Representative examples of uses for the thermoplastic elastomers of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials also can be used in damping applications in equipment producing vibration or noise and household electrical appliances, such as in air-conditioners, laundry machines, refrigerators, electric fans, vacuums, dryers, printers and ventilator fans. Further, these materials also are suitable for impact absorbing materials in audio equipment and electronic or electrical equipment, sporting goods and shoes. Further, as super low hardness rubbers, these materials are applicable for use in appliances, damping rubbers, and as low hardness plastics and/or molding materials. Further, because these compositions can be used to control the out-migration of internal low molecular weight materials, they can be useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

in audio equipment, such as in insulators for a portable CD or a CD mounted on a vehicle, microphone holders for home video cassette recorders, radio cassette recorders, karaoke machines, or handy microphone, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HHD and stepping motor, insulators for floppy disk drive, insulators for CD-ROM of personal computer, and a holder for optical disk;

in communication equipment, such as in a holder for compact high performance mike or the speaker of a portable telephone, a pocket bell or PHS, a microphone holder for wireless equipment, and a disk holder for portable note type electronic equipment;

in home electronics equipment, such as in insulators for the CD-ROM of a home TV game, insulators for cassette holders or CD-ROM of cassette holder or a game machine, a holder of a high performance mike and cone edge of a speaker; and in other applications, such as in damping materials for the printer head of a word processor, printer of a personal computer, small or middle handy type printer or name printers, and insulators for CD-ROMs used for measure equipment.

The present invention is described in more detail with reference to the following non-limiting examples.

Examples

Example 1
Preparation of Gelation Polymers

A near-gelation polymer was prepared using 19.7388 g TH-21 liquid hydrogenated, hydroxy-terminated polyisoprene prepolymer (Kuraray, Inc.; Tokyo, Japan) endlinked by a condensation reaction with 0.6563 g of a multifunctional crosslinking agent, toluene diisocyanate (T3985-3) having a purity of 99% (Aldrich Chemical Co.; Milwaukee, Wis.) (See Table 1). The gel point of this system was $r_c = W_T/W_{TH-21} = 0.0333$ (determined by the method described above).

The mixtures of crosslinking agent and prepolymer were carefully weighed into flasks on a balance with $10^{-4}$ g accuracy. The mixtures were vigorously stirred at 22° C. for at least 30 minutes to dissolve the crosslinking agent in the prepolymer. The mixture was cured at 70° C. for 3 days to produce a near-gelation polymer.

The glass transition temperature, as measured by DSC, of the near-gelation polymer was about −40° C.

TABLE 1

Prepolymer System Used

| Trade Name | Structure | Manufacturer | $M_n$ | $M_w$ | $M_z$ | Average Functionality |
|---|---|---|---|---|---|---|
| TH-21 | FPR | Kurary, Inc. | 2600 | 8400 | 22000 | 2.6 |
| T3985-3 | TDI | Aldrich Chemical | 174 | — | — | 2 |

Examples 2–12
Preparation of Thermoplastic Elastomers

The near-gelation polymer from Example 1 and 40 g of a maleated polypropylene were mixed in a $N_2$-purged Brabender mixer (~55 g capacity) equipped with a roller blade that was initially set to 60 rpm and 180° C. The ratio of the maleated polypropylene and the near gelation polymer that was added to the mixer varied in each example, but the sum of the amounts of the two polymers was kept constant (40 g). Three different types of maleated polypropylene were used in the examples. The physical properties and the commercial sources of the three maleated polypropylenes are listed in Table 2.

TABLE 2

Types of Maleated Polypropylene Used

| Name | Manufacturer | $T_m$ (° C.) | $M_w$ | Approximate maleic anhydride content (wt. %) |
|---|---|---|---|---|
| UMEX 1010 | Sanyo Chemical | 145 | 30,000 | 1.5% |

TABLE 2-continued

Types of Maleated Polypropylene Used

| Name | Manufacturer | $T_m$ (° C.) | $M_w$ | Approximate maleic anhydride content (wt. %) |
|---|---|---|---|---|
| 42784-5 | Aldrich Chem. | 155 | 9,100 | 2% |
| PO1015 | Exxon Chem. | 142 | 20,000 | 0.4% |

The mix process was continued for 30 minutes. The torque of the mixing was monitored during the entire experiment with a computer. Increased torque was observed during the course of mixing evidencing a reaction between the near-gelation polymer and the maleated polypropylene—the torque after 30 minutes was about two to five times of the torque that was measured after one minute of mixing. After 30 minutes of mixing, 8 g silicone oil was added to the mixer. Mixing was continued at the above conditions for about three additional minutes.

The reaction products were then removed from the mixer and were molded into sheets and cylinder buttons at 160° C. according to standard processing techniques. Ring samples were cut for tensile measurements. Tensile strength measurements were performed according to ASTM-D 412 at 22° C. Test specimens were in the form of a ring having a width and thickness of about 0.19 cm. The specimen was tested at a specific gauge of length of 2.54 cm. Hysteresis loss was measured by a dynamic rheometer. The test specimen was in the form of a bar having a width of 1.27 cm, a thickness of 0.635 cm, and a length of 2.54 cm. The details of the physical properties of the final product are listed below in Tables 3 and 4. (In each of examples 2–4, the polypropylene concentration was about 20% (by wt.)). In examples 5–12, the amount of polypropylene was varied as shown in Table 4.

Compression Set (CS) was measured in accordance with ASTM D395-89, except that the sample height was 1.27 cm and sample diameter was 1.43 cm. The samples were compressed to 0.95 cm and stored in an oven at 70° C. for 22 hours. When the samples were removed from the oven, the stress thereon was relieved, and the samples were recovered at room temperature for 30 minutes. Recovery was measured as the final sample height ($h_f$) and CS was determined according to the formula $CS = 100[(0.5 - h_f)/(0.5 - 0.375)]$.

TABLE 3

Effects of Type of Polypropylene Used

| Example | Type of PP | Shore A | CS (70° C., 22 hr) | $T_b$ (kPa) | $E_b$ (%) |
|---|---|---|---|---|---|
| 2 | PO1015 | 3 | 87.5 | 193 | 405 |
| 3 | 42784-5 | 37 | 54.8 | 924 | 121 |
| 4 | UMEX 1010 | 43 | 37.3 | 607 | 61 |

As can be seen in Tables 3 and 4, the compound properties depend largely on the particular maleated polypropylene used. The thermoplastic elastomers using maleated polypropylene having lower $M_w$ and higher MA% displayed lower compression set values. The effects of polypropylene content are shown in Table 4. The thermoplastic elastomers prepared in Examples 5 to 12 exhibited very well balanced tensile strength, hysteresis loss, softness and compression set.

TABLE 4

Effects of Polypropylene Content

| Example | Type of PP | Amt. of PP (%) | Shore A | CS (70° C., 22 hr) | Tan δ at 25° C. | $T_b$ (kPa) | $E_b$ (%) |
|---|---|---|---|---|---|---|---|
| 5 | UMEX 1010 | 20 | 43 | 37.3 | 0.199 | 607 | 61 |
| 6 | UMEX 1010 | 15 | 29 | 46.1 | 0.251 | 586 | 132 |
| 7 | UMEX 1010 | 10 | 10 | 42.2 | 0.404 | 393 | 173 |
| 8 | 42784-5 | 20 | 37 | 54.8 | 0.848 | 924 | 121 |
| 9 | 42784-5 | 15 | 18 | 49.6 | 0.371 | 876 | 294 |
| 10 | 42784-5 | 10 | 7 | 54.3 | 0.524 | 407 | 353 |
| 11 | 42784-5 | 10 | 7 | 49.0 | 0.622 | 1082 | 566 |
| 12 | 42784-5 | 10 | 8 | 53.0 | 0.598 | 779 | 566 |

What is claimed is:

1. A thermoplastic elastomer comprising a multi-block polymer including hard segments and soft segments, said hard segments comprising polymeric chains of a crystalline polyalkylene and said soft segments comprising a near gelation polymer, wherein said hard segments and said soft segments are connected via covalent bonds, said near-gelation polymer having at least one functional group capable of being linked to a functional group on the polyalkylene and being the reaction product of a prepolymer and a crosslinking agent, said near-gelation polymer having a physical state relative to its gelation point defined by $0 \leq |(r-r_g)/r_g| \leq 0.5$ where r is the weight ratio of said crosslinking agent to said prepolymer and $r_g$ is the weight ratio of said crosslinking agent to said prepolymer at the gelation point.

2. The thermoplastic elastomer of claim 1 wherein said prepolymer and said crosslinking agent each contain at least two reactive functional groups independently selected from the group consisting of hydroxy, amino, carboxylic acid, isocyanate, oxirane and succinyl oxide groups.

3. The thermoplastic elastomer of claim 1 wherein said crystalline polyalkylene comprises monomer units derived from at least one of the group consisting of ethylene and $C_3$ to $C_7$ α-olefins.

4. The thermoplastic elastomer of claim 3 wherein said crystalline polyalkylene comprises a maleated polypropylene.

5. The thermoplastic elastomer of claim 4 wherein said maleated polypropylene has a molecular weight below about 10,000.

6. The thermoplastic elastomer of claim 7 wherein said maleated polypropylene has a maleic anhydride content above about 0.2%.

7. The thermoplastic elastomer of claim 1 wherein said crystalline polyalkylene is functionalized by reaction with at least one of the group consisting of acid anhydrides, unsaturated carboxylic acids, primary amines, and secondary amines.

8. The thermoplastic elastomer of claim 7 wherein said crystalline polyalkylene is functionalized by reaction with at least one of the group consisting of:
phthalic anhydride, hexahydrophthalic anhydride, maleic anhydride, fumaric anhydride, itaconic anhydride, pyromellitic anhydride, trimellitic anhydride, succinic anhydride, citraconic anhydride, cyclohexane dicarboxylic anhydride, madic anhydride, and alkyl and alkenyl derivatives thereof; acrylic acid, methacrylic acid, ethacrylic acid, maleic acid, fumaric acid, and itaconic acid.

9. The thermoplastic elastomer of claim 1 wherein said prepolymer has functional groups selected from the group consisting of primary amino, secondary amino, hydroxyl, carboxyl, vinyl, epoxy, anhydride, aryl halide, carboxylic acid anhydride, carboxamide, and isocyanate groups.

10. The thermoplastic elastomer of claim 1 wherein said prepolymer comprises hydrogenated styrene/butadiene rubber, hydrogenated nitrile rubber, ethylene/propylene rubber, ethylene/propylene/diene rubber, ethylene/butene rubber, ethylene/butene/diene rubber, acrylic rubber, chlorinated polyethylene rubber, fluororubber, silicone rubber, urethane rubber, polysulfide rubber, hydrogenation product of styrene/butadiene block polymer, α,β-unsaturated nitrile/acrylate/conjugated diene copolymer rubber, styrene/butadiene copolymers, polyisoprene, nitrile rubber, chloroprene rubber or butyl rubber.

11. The thermoplastic elastomer of claim 1 wherein said thermoplastic elastomer has a tan δ ranging between about 0.1 to about 1.0 from about −20° to about 100° C.

12. The thermoplastic elastomer of claim 1 wherein said thermoplastic elastomer has a Shore A hardness at about 20° to 25° C. of from 0 to about 40.

13. The thermoplastic elastomer of claim 1 wherein said thermoplastic elastomer has a 100° C. compression set of from about 30 to about 65%.

14. The thermoplastic elastomer of claim 1 wherein said hard segments and soft segments are randomly distributed.

15. The thermoplastic elastomer of claim 1 further comprising a plasticizer.

16. A thermoplastic elastomer made by reacting a near-gelation saturated polymer with a crystalline polyalkylene for a time sufficient to form said elastomer, said near gelation saturated polymer having at least one functional group capable of being linked with at least one functional group on the crystalline polyalkylene, said near gelation saturated polymer being the reaction product of a prepolymer and a crosslinking agent and having a physical state relative to its gelation point defined by $0 \leq |(r-r_g)/r_g| \leq 0.5$ where r is the weight ratio of said crosslinking agent to said prepolymer and $r_g$ is the weight ratio of said crosslinking agent to said prepolymer at the gelation point.

17. A method of making a thermoplastic elastomer comprising:

a) subjecting a composition comprising a liquid, crosslinkable polymer having low or no unsaturation to the action of a crosslinking agent so as to form a near-gelation elastomer, said near-gelation elastomer having a physical state relative to its gelation point defined by $0 \leq |(r-r_g)/r_g| \leq 0.5$, in which r is the weight ratio of the crosslinking agent to the crosslinkable polymer, and $r_g$ is the weight ratio of the crosslinking agent to the crosslinkable polymer at the gelation point; and b) allowing a covalent bond to form between at least one functional group on each of said near-gelation elastomer and a crystalline polyalkylene.

18. A method of making a thermoplastic elastomer comprising:
  a) crosslinking a polymer whose gelation point is known with a crosslinking agent, the crosslinking agent being added in sufficient amount to form a near-gelation polymer, said near-gelation polymer having a physical state relative to the gelation point defined by $0 \leq |(r-r_g)/r_g| \leq 0.5$, in which r is the weight ratio of the crosslinking agent to polymer, and $r_g$ is the weight ratio of the crosslinking agent to the polymer at the gelation point; and
  b) linking the near-gelation polymer to a crystalline polyalkylene via at least one functional group on the near-gelation polymer and at least one functional group on the crystalline polyalkylene to form the thermoplastic elastomer.

19. The method of claim 18 wherein the near-gelation polymer has a physical state relative to the gelation point defined by $0 \leq |(r-r_g)/r_g| \leq 0.2$.

* * * * *